United States Patent [19]

Tagashira et al.

[11] 4,070,281
[45] Jan. 24, 1978

[54] METHOD FOR TREATING WASTE WATER

[75] Inventors: Yoshiaki Tagashira; Hitoshi Takagi; Katsumi Inagaki; Kanji Ishii, all of Kurashiki; Hiroyuki Ohashi, Yokohama, all of Japan

[73] Assignee: Asahi Kasei Kogyo Kabushiki Kaisha, Osaka, Japan

[21] Appl. No.: 600,537

[22] Filed: July 31, 1975

[30] Foreign Application Priority Data

Aug. 5, 1974 Japan .................................. 49-88982
Nov. 11, 1974 Japan ............................. 49-128961

[51] Int. Cl.$^2$ .......................... C02B 1/34; C02C 5/04
[52] U.S. Cl. ........................................ 210/26; 210/45; 210/63 R; 210/DIG. 31
[58] Field of Search ............... 210/45, 60, 63 R, 38 B, 210/DIG. 31, 50, 26

[56] References Cited

U.S. PATENT DOCUMENTS

| | | | |
|---|---|---|---|
| 2,459,464 | 1/1949 | Smith | 210/63 R |
| 3,196,107 | 7/1965 | Tomic | 210/38 B |
| 3,715,309 | 2/1973 | Zumbrunn et al. | 210/63 R |
| 3,843,516 | 10/1974 | Yamoda et al. | 210/63 R |
| 3,912,626 | 10/1975 | Ely et al. | 210/63 R |

*Primary Examiner*—Thomas G. Wyse
*Attorney, Agent, or Firm*—Burgess, Dinklage & Sprung

[57] ABSTRACT

In wet-oxidizing organic waste water containing cyanogen i.e. inorganic-CN, or a compound capable of forming cyanogen under oxidative conditions, if the wet oxidation is conducted in the presence of copper or a copper compound and a specific ammonium salt, COD and the cyanogen concentration can be reduced at highly improved removal ratios. Copper ions resulting from the copper component made present at the wet oxidation step can be effectively removed by precipitation or ion exchange. Accordingly, this treatment method does not cause secondary pollution at all. In case recovery of the copper ions is performed by ion exchange, good results are obtained when the oxidized liquid from the wet oxidation step is flashed at a temperature higher than 100° C. and the pH of the oxidized liquid is adjusted to 4-7 after the cyanogen decomposition step but before the ion exchange treatment. A weakly acidic ion exchange resin is preferably employed. When recovery of the copper ions is performed by precipitation, good results are obtained when sulfide type insolubilizing agents are employed.

13 Claims, No Drawings

METHOD FOR TREATING WASTE WATER

This invention relates to a treatment of organic waste water containing cyanogen, i.e. inorganic -CN, or an organic compound capable of forming cyanogen under oxidative conditions under which conditions such waste water is subjected to a wet oxidation treatment.

More specifically, the invention relates to a method for treating organic waste water containing cyanogen or an organic compound capable of forming cyanogen under oxidative conditions, which comprises subjecting such waste water to a wet oxidation process in the presence of copper or a copper compound and a specific ammonium compound, subjecting the effluent from the wet oxidation process to gas-liquid separation, oxidation-decomposing the cyanogen remaining in the recovered oxidized liquid and recoverying the copper component from the oxidized liquid by precipitation or ion exchange. When recovery of the copper component is performed by precipitation, an insolubilizing agent is added to the oxidized liquid from the gas-liquid separation step to render the copper component contained in the liquid insoluble and the precipitated copper component is separated and recovered from the liquid. When recovery of the copper component is performed by ion exchange, the effluent from the oxidation process is flashed at a temperature higher than 100° C., the oxidized liquid from the flashing step is cooled to room temperature, the cyanogen remaining in the liquid is oxidized and decomposed, the pH of the liquid is adjusted to 4 to 7 directly or after dilution with water to completely ionize the copper component in the liquid, the liquid is then subjected to degassing to remove dissolved gases, floating suspended substances are removed according to need, and the liquid is contacted with a weekly acidic ion exchange resin to concentrate and separate the dissolved copper component. The so recovered copper component is recycled to the wet oxidation process, if desired.

As is well known in the art, cyanogen-containing organic waste waters have heretofore been treated according to the wet oxidation process. As such cyanogen-containing waste water, there can be mentioned, for example, highly contaminated waste water discharged from a plant of manufacture of nitrile compounds. A reaction gas containing nitrile compounds, cyanogen compounds, ammonia, high-boiling-point polymeric compounds and the like is discharged from the process of preparing nitrile compounds from hydrocarbons by ammoxidation. In order to separate nitrile compounds, sulfuric acid is added to this reaction gas in an amount sufficient to fix ammonium in the form of ammonium sulfate and the gas is simultaneously cooled. accordingly, waste water discharged from this cooling step contains minute amounts of nitrile compounds, cyanogen compounds, high-boiling-point polymers and the like, and this highly contaminated waste water is ordinarily subjected to the wet oxidation process as described above. When waste water containing chemical oxygen-demanding substances (hereinafter referred to as "COD substances") including cyanogen compounds at high concentrations is treated according to this wet oxidation method, the concentration of the cyanogen compounds can be reduced to below 1 mg/liter, but the degree of oxidation and decomposition of the total COD substances is as low as about 50 to about 80%. Accordingly, the effect of prevention of environmental pollution cannot be obtained unless the liquid discharged from the wet oxidation process is further subjected to a series of post-treatments. In order to attain such a high oxidation-decomposition degree as 90 to 99% by the wet oxidation process, it is necessary to adopt very drastic conditions for the wet oxidation, and from the technical and industrial viewpoints it is practically very difficult or impossible to conduct the wet oxidation process under such drastic conditions on an industrial scale.

We previously found that the foregoing shortcomings can be overcome and a very high oxidation-decomposition degree can be attained when the wet oxidation is carried out in the presence of copper or a copper compound and a sepcific ammonium salt. In the oxidized liquid recovered from this wet oxidation method, the concentration of the remaining cyanogen compounds is 10 to 50 ppm and even if dissolved copper ions are removed by a customary treatment method, such as an ion exchange method, an alkali precipitation method and a sulfide treatment method, copper ions are still left at a concentration of 10 to 100 ppm. In short, although the concentration of the total COD substances can be reduced to a low level at a high oxidation degree, harmful substances such as cyanogen and copper remain in the oxidized liquid to cause a problem of secondary pollution. In case the wet oxidation is carried out in the presence of copper or copper compound and a specific ammonium salt, the presence of cyanogen detectable according to the pyridinepyrazolone determination method (the cyanogen ion generated at a pH lower than 2 is determined) cannot be avoided if the wet oxidation is performed under customary conditions (the oxidation temperature of 200° to 300° C., the pressure of 30 to 150 $Kg/cm^2$ and the reaction time of 0.5 to 2.0 hours). Accordingly, it may be considered to adopt a method in which the wet oxidation is carried out in the absence of copper or a copper compound to eliminate cyanogen compounds detectable according to the above determination method (below 1 mg/liter) and then, large quantities of remaining COD substances are selectively wet-oxidized in the presence of copper or a copper compound and a specific ammonium salt. However, even according to this method, the presence of cyanogen detectable according to the above determination cannot be avoided (the presence of cyanogen is detected again in the oxidized liquid) and removal of copper cannot be accomplished completely. In short, the problem of secondary pollution remains unsolved.

It is therefore a primary object of this invention to provide a method for completely treating organic waste waters containing cyanogen or substances capable of forming cyanogen under oxidative conditions, which can solve the above problem of secondary pollution caused by the presence of copper or a copper compound and a specific ammonium salt and in which the treatment of such waste waters can be performed at low operation costs with economical advantages.

In accordance with the fundamental aspect of this invention, there is provided a method for treating organic waste water containing cyanogen or an organic compound capable of forming cyanogen under oxidative conditions to render it harmless by oxidation which comprises subjecting such waste water to a high temperature, high pressure, wet oxidation treatment in the presence of copper or a copper compound and at least one ammonium salt selected from the group consisting of ammonium sulfate, ammonium nitrate, ammonium sulfamate, ammonium hydrogencarbonate, ammonium chloride, ammonium iodide, ammonium formate, ammonium acetate, ammonium oxalate and ammonium hydrogentartarate, subjecting the effluent from the wet oxidation process to gas-liquid separation, oxidation-decomposing the cyanogen remaining in the recovered oxidized liquid and recovering the copper component from the oxidized liquid.

When the copper component is recovered from the oxidized liquid by precipitation, the temperature for the preceding step of gas-liquid separation of the effluent from the wet oxidation process is not particularly critical but may preferably be room temperature to 300° C. For example, the effluent from the wet oxidation process may be, as such, subjected to a gas-liquid separation. After the cyanogen remaining in the recovered oxidized liquid has been oxidation-decomposed with a substance capable of generating oxygen in the nascent state in water, an insolubilizing agent such as sulfides is added to the oxidized liquid to convert it to an insoluble precipitate. This precipitate is filtration-separated according to customary procedures.

When the copper component is recovered from the oxidized liquid by ion exchange, the effluent from the wet oxidation treatment is flashed at a temperature higher than 100° C. to effect gas-liquid separation, the high temperature oxidized liquid is cooled to room temperature, the cyanogen remaining in the oxidized liquid is decomposed in the same manner as described above, the pH of the so treated liquid is adjusted to 4 to 7 so as to perform the ion-exchanging treatment mentioned below smoothly at a high efficiency, the liquid is degassed to remove dissolved gas such as carbon dioxide gas, and the liquid is contacted with a weakly acidic salt-type ion exchange resin to separate and recover the copper component in the concentrated state. The so recovered copper component may be recycled to the wet oxidation process, if desired.

In short, the treatment method of this invention comprises the steps of wet oxidation in the presence of copper or a copper compound and a specific ammonium salt, gas-liquid separation, decomposition of cyanogen and precipitation of the copper component when recovery of the copper component is performed by precipitation, or it comprises the steps of the same wet oxidation as mentioned above, gas-liquid separation by high temperature flashing, decomposition of cyanogen, pH adjustment and recovery of the copper component using an ion exchange resin when recovery of the copper component is performed by ion exchange.

This invention will now be described in detail.

One of critical features of the treatment method of this invention is that the wet oxidation is carried out in the presence of copper or a copper compound and a specific ammonium salt, whereby the degree of oxidation and decomposition of COD substances can be greatly enhanced. After this wet oxidation, the oxidized liquid is subjected to gas-liquid separation which is divided into two types depending on the method of recovery of the copper component.

More specifically, when the copper component is recovered by ion exchange, the oxidized liquid from the wet oxidation process is flashed at a temperature higher than 100° C. to effect gas-liquid separation. The reason for adoption of this flashing method is as follows:

When copper ions are recovered by contacting the oxidized liquid with an ion exchange resin, opimum results are obtained if the pH of the liquid is adjusted within the range of 4 to 7. In order to reduce the amount of an acid necessary for this pH adjustment to a minimum level, it is preferred that alkaline substances dissolved in the liquid, such as ammonia, be removed from the liquid phase. Accordingly, flashing is conducted at a high temperature exceeding 100° C. to transfer such alkaline substances into the gas phase.

The oxidized liquid from the flashing gas-liquid separation step is cooled to room temperature, and cyanogen compounds remaining in the liquid are oxidized and decomposed with an oxidizing agent capable of generating oxygen in the nascent state in water. Then, the pH of the liquid is adjusted within the above-mentioned optimum range of 4 to 7. By this pH adjustment, carbon dioxide gas or the like formed by oxidation of COD substances is rendered likely to bubble. This means that degassing, which is conducted to prevent undesired reduction of the solid-liquid contact efficiency caused by bubbling on contact between the ion exchange resin and the oxidized liquid, can be greatly facilitated. After the degassing, the oxidized liquid is passed through a layer of the ion exchange resin to effect ion exchange and separate and recover copper ions.

When the copper component dissolved in the liquid is recovered and separated as an insoluble precipitate, gas-liquid separation of the oxidized liquid from the wet oxidation process can be performed regardless of the temperature condition. For example, the liquid is then cooled to room temperature and cyanogen is oxidized and decomposed in the same manner as described above. Then, an insolubilizing agent such as sulfides of the triazine type is added to the liquid to render dissolved copper insoluble, and the precipitated copper sulfide or the like is separated and recovered by filtration or decantation.

In this invention, metallic copper powder, copper sulfate, copper sulfide, copper hydroxide, copper nitrate and basic copper sulfate are preferably used as copper or the copper compound to be used for the wet oxidation.

The amount of the copper component to be made present is changed to some extent depending on the kind of the pollutant to be treated and the desired degree of oxidation, but it is generally preferred that the copper component be made present in an amount of 10 to 1,000 ppm in terms of copper amount. If the amount of the copper component is smaller than 10 ppm, no substantial effect can be attained, and even if the copper component is made present in an amount exceeding 1,000 ppm, no substantial increase of the oxidation-decomposition degree is attained by the load for recovery of the copper component is increased. The oxidation-decomposition degree is substantially in a direct proportion to the amount incorporated of the copper component, and if the oxidation temperature is constant, the amount of the copper component to be added is automatically determined based on the desired degree of oxidation. However, the concentration of the remaining cyanogen compounds is not influenced by the amount of the copper component and it is generally within the range of 10 to 50 ppm substantially regardless of the amount added of the copper component.

As the ammonium salt effective for decomposition of COD substances, there can be mentioned, for example, ammonium sulfate, ammonium nitrate, ammonium sulfamate and ammonium hydrogencarbonate. Ammonium halides such as ammonium chloride and and ammonium iodide are regarded as being not preferred because of their corrosive action to equipment materials. In this case, however, if titanium, platinum, palladium or an alloy thereof is coated on the inner face of the equipment, the corrosion problem can be eliminated. Organic ammonium salts such as ammonium formate, ammonium acetate, ammonium oxalate and ammonium hydrogentartarate may also be employed. When such organic ammonium salts are employed, it is necessary to appropriately choose a kind and amount of organic ammonium salt and wet oxidation temperature, depending on the kinds of COD substances (e.g. cyanogen compounds, nitriles such as acetonitrile, acrylonitrile, propionitrile, succinonitrile and malononitrile, acetaldehyde and high-boiling-point polymers thereof) contained in the waste water, so that the organic ammonium salts employed are not decomposed during the course of wet oxidation treatment before the COD substances are completely decomposed. It is preferred that the ammonium salt be made present in an amount of at least 1,200 ppm in terms of ammonium ion. The use of ammonium salt of more than 1,200 ppm does not bring about a better effect but the salt can be used in an amount of solubility limit.

As the oxygen source to be used for the wet oxidation in this invention, there can be mentioned, for example, air, oxygen-enriched air and oxygen gas. In order to obtain a higher degree of oxidation and control the amount of the remaining cyanogen compound within the above-mentioned range, it is preferred that the amount of oxygen be larger than the amount equivalent to the COD amount in waste water. If the amount of oxygen is smaller than the equivalent amount, a high degree of oxidation cannot be obtained because of shortage of oxygen and the amount of the remaining cyanogen compound increases. Accordingly, the amount of an oxidizing agent required for decomposition of the cyanogen compound increases. When the wet oxidation is carried out in the presence of copper or a copper compound and a specific ammonium salt such as mentioned above, the ratio of the amount of oxygen utilized for oxidation and docomposition to the amount of oxygen actually fed is enhanced. When the wet oxidation is conducted in the absence of the above copper component and ammonium salt component, the ratio of the amount of COD substances removed to the amount of oxygen consumed is high, and thermal decomposition of COD substances proceeds coincidentally with oxidation. If copper or a copper compound and a specific ammonium salt such as mentioned above are made present, thermal decomposition is hardly caused and oxidation alone is caused to proceed selectively. Therefore, COD substances are fixed in substantially harmless forms such as carbon dioxide gas, nitrogen gas and water, and the smell of the exhaust gas is considerably eliminated.

In this invention, the wet oxidation is carried out at a temperature of 175° to 300° C. and the oxidation reaction proceeds very rapidly at a temperature of 175° to 190° C.

At the wet oxidation step, it is necessary that the operation pressure should be maintained at a level higher than the vapor pressure at the treatment temperature, so as to perform the oxidation in the liquid phase. In general, it is preferred that the operation pressure be higher by about 10 to about 40 Kg/cm$^2$ than the vapor pressure of water at the treatment temperature, i.e. 20–150 kg/cm$^2$ at 175° to 300° C. However, even if the operation pressure is extremely elevated, no substantial contribution to increase of the oxidation and decomposition degree can be attained, but there are brought about various disadvantages. For example, the size of the oxidation apparatus should be made large and the operation stability is drastically lowered.

In this invention, very high oxidation and decomposition degree can be attained by the above-mentioned wet oxidation. For example, when the wet oxidation is conducted for 0.5 to 2.0 hours at 200° to 300° C., 90 to 99% of COD substances are oxidized and decomposed.

The recovered oxidized liquid containing cyanogen and the copper component is then subjected to the treatments for removal of cyanogen and the copper component. As pointed out hereinbefore, different methods are adopted for these post-treatments depending on the method of recovery of the copper component.

In case the copper component is separated and recovered in the form of an insoluble precipitate, after the wet oxidation, gas-liquid separation is conducted. In this case, the temperature for this gas-liquid separation is not critical. Then, the oxidized liquid is subjected to the treatment for oxidizing and decomposing the remaining cyanogen at room temperature under atmospheric pressure. Then, an insolubilizing agent such as sulfides of the triazine type, hydrazine sulfate and sodium sulfide is added to the oxidized liquid to render the copper component insoluble. The precipitated copper component is separated and recovered by filtration or decantation to complete the waste water treatment.

In case the copper component is concentrated and separated in the dissolved state by ion exchange, after the wet oxidation gas-liquid separation is accomplished by flashing (pressure reduction separation) at a temperature higher than 100° C. Then, the oxidized liquid is cooled to room temperature and remaining cyanogen is oxidized and decomposed. The pH of the oxidized liquid as it is or after dilution with water is adjusted to 4 to 7, and the liquid is subjected to degassing to remove dissolved gases formed by oxidation, such as carbon dioxide gas, from the liquid. Then, the degassed liquid is contacted with a weakly acidic ion exchange resin of the salt type to recover the copper component in the concentrated state. Thus, the waste water treatment is completed.

One of features of this invention resides in that removal of the copper component is carried out after the treatment for oxidation and decomposition of cyanogen. When the copper component is removed by precipitation using an insolubilizing agent or ion exchange using a weakly acidic ion exchange resin prior to decomposition of cyanogen, the copper component cannot the removed completely and scores of ppm of the copper component remains unremoved in the liquid. In contrast, if the recovery of the copper component is conducted after cyanogen has been oxidized and decomposed, the copper component can be removed substantially quantitatively.

According to one method for removal of cyanogen, a mineral acid such as sulfuric acid is added to the oxidized liquid from the gas-liquid separation step to reduce the pH of the liquid, whereby the cyanogen compound is dissociated and converted to hydrogen cyanide, and this hydrogen cyanide is stripped together with dissolved carbon dioxide formed by oxidation of COD substances. However, according to this method, removal of the cyanogen compound is not complete and a problem is brought about as regards disposal of hydrogen cyanidecontaining exhaust gas. Further, neutralization should be conducted to precipitate the copper component dissolved in the oxidized liquid, and in this case, the copper component cannot be removed completely. Accordingly, it is preferred that cyanogen be fixed in the form of harmless nitrogen gas and carbon dioxide ($CN + O_2 \rightarrow N_2 + CO_2$) by using an oxidizing agent. As the oxidizing agent preferably used for this purpose, there can be mentioned substances capable of generating oxygen in the nascent state, for example, hypochlorites, hydrogen peroxide, persulfates and ozone. The intended effect can be attained when such oxidizing agent is used in a stoichiometric amount, but it is generally preferred that it be used in 5 to 10% excess. The temperature for this treatment is generally within the range of 10° to 90° C. At a temperature lower than 10° C., the rate of oxidation is low and at a temperature higher than 90° C., oxygen is not effectively utilized. The treatment time is generally 5 to 20 minutes.

The residual cyanogen concentration in the oxidized liquid which has been treated under ordinary wet oxidation condition (225° to 275° C. and 40 to 100 Kg/cm$^2$) is generally within the range of 10 to 50 ppm. Accordingly, the optimum amount of the oxidizing agent can easily be determined. This means that excessive use of the oxidizing agent is prevented and no excessive load is imposed on the subsequent step of recovery of the copper component. In short, the operation stability can be highly improved. If the oxidizing agent is used in an excessive amount, since the excess of the oxidizing agent which has not been consumed for oxidation of cyanogen reacts selectively with an insolubilizing agent mentioned below and hence, the amount of the insolutilizing agent required for separation of the copper component is increased, resulting in economical disadvantages.

As the insolubilizing agent to be used in this invention, there can be mentioned sodium sulfide, sulfides of the triazine type, hydrazine sulfate, hydrosulfite, ferrous chloride, iron powder, calcium phosphate, a weakly acidic ion exchange resin, and an aqueous slurry mixture comprising 10 to 20% by weight of ferrous sulfate, 2 to 10% by weight of sodium sulfide and 1 to 5% by weight of calcium hydroxide. In this invention, it is possible to adopt a two-staged method comprising first adding a cheap insolubilizing agent to the oxidized liquid to precipitate the majority of the copper component and then adding an effective insolubilizing agent to the liquid to precipitate a minute amount of the remaining dissolved copper component. The treatment is generally conducted at a reaction temperature of 10° to 70° C. for a treatment time of 5 to 60 minutes. The insolubilizing agent reacts with the copper component in the oxidized liquid to form an insoluble copper compound substantially quantitatively. The sedimented precipitate is excellent in adaptability to filtration and dehydration.

In case the copper component is separated and recovered in the soluble form by using an ion exchange resin, after the wet oxidation the oxidized liquid is preferably flashed at a temperature higher than 100° C. to effect gas-liquid separation. As pointed out hereinbefore, the pH of the oxidized liquid is adjusted to 4 to 7 so as to facilitate the subsequent treatments. When the gas-liquid separation is performed by flashing at a temperature higher than 100° C., the amount of an acid added for this pH adjustment can be reduced. This effect, however, is limitative. Namely, although the amount required of the acid is reduced in proportion to elevation of the flashing temperature, if the flashing temperature exceeds 200° C., the amount required of the acid is almost constant. After the oxidized liquid is thus flashed at a temperature higher than 100° C., the liquid is cooled to 10° to 90° C. and is subjected to the above-mentioned treatment for decomposition of cyanogen. The pH of the liquid is adjusted to 4 to 7. Prior to the pH adjustment, the liquid may be diluted with water. Then, the liquid is subjected to the degassing treatment, because bubbling of dissolved gases on contact with the ion exchange resin reduces the efficiency of the solid-liquid contact. After the foregoing treatments, the dissolved copper component is recovered by ion exchange and is then recycled to the wet oxidation process, if desired.

When heavy metal ions are separated by using a weakly acidic ion exchange resin, reduction of the pH of a liquid to be treated is generally disadvantageous because the adsorbing capacity of the resin is lowered by reduction of the pH. In this invention, however, a copper complex dissolved in the liquid oxidized under high temperature and high pressure conditions is converted to a readily ionizing form or to copper ions by dissociation by the oxidizing agent and the above-mentioned pH adjustment, and hence, the copper component can be effectively adsorbed on the salt type ion exchange resin. Thus, the copper component is concentrated and separated. The relation as shown in Table 1 given below is established between the pH of the liquid and the equilibrium adsorption of copper ions (the amount of copper ions adsorbed on the resin when the liquid is passed in an infinite amount and the absorption of copper ions reaches the equilibrium state). The tendency seen from Table 1 is hardly changed even if the copper ion concentration in the liquid to be treated is changed. (The date shown in Table 1 are those obtained when the gas-liquid separation was conducted at 90° C.)

Table 1

| pH | Equilibrium Adsorption (g of Cu per liter of resin) |
| --- | --- |
| 3.0 | 2.4 |
| 4.0 | 13.5 |
| 5.0 | 44.0 |
| 6.0 | 55.6 |
| 7.0 | 25.4 |
| 8.2 (not adjusted) | 9.8 |

As is seen from the above data, when the pH is reduced below 4, the equilibrium adsorption is remarkably lowered, and when the pH is higher than 7, the equilibrium adsorption is lowered and further, the exchange band length (the minimum resin packed height necessary for removal of copper ions) is prolonged. Moreover, growth of crystals of copper hydroxide is accelerated to make it difficult to perform the operation stably.

In adjusting the pH of the liquid to be treated according to this invention, if the copper ion concentration in the liquid is relatively high, it is necessary to dilute the liquid with water to such a concentration as not causing precipitation of copper hydroxide prior to the pH adjustment. In this connection, it is noted that it is advantageous to employ the effluent water from the ion exchange as water for diluting the liquid. If the liquid containing precipitated copper hydroxide or containing copper ions in the supersaturated state is passed through a layer of the ion exchange resin, copper hydroxide is deposited on the resin layer to reduce theion exchange efficiency. In an extreme case, a part of the resin layer is rendered massive and the treatment becomes impossible.

When copper ions are recovered according to this method, any of conventional treatment systems can be addopted. Namely, the ion exchange can be accomplished according to a customary fixed bed method or continuous ion exchange method. More specifically, when the treatment scale is small, the fixed bed method is preferably adopted, and when the treatment scale is large or it is desired to increase the concentration of recovered copper, the ion exchange is conducted according to the continuous method.

This invention will now be described in detail by reference to the following Examples that by no means limit the scope of this invention.

EXAMPLE 1

A 1,000 ml-inner capacity autoclave composed of SUS 32 and equipped with a stirrer was charged with 400 ml of an acetic acid-sodium cyanide aqueous solution having a CODCr value (the amount of consumed oxygen determined according to the potassium dichromate method; same will apply hereinafter) of 10,300 ppm and a T-CN value (the total cyanogen concentration determined according to the pyridine-pyrazolone method; same will apply hereinafter) of 752 ppm, a combination of a copper compound indicated below and an ammonium salt indicated below and 15.6 liter (as measured in the normal state) of air, and oxidation of the solution was conducted at 250° C. under 75 Kg/cm² for 1 hour. The composition of the oxidized liquid was as shown in Table 2.

Table 2

| Copper Compound* | Ammonium Salt** | CODCr Value (ppm) of Oxidized Liquid | T-CN Value (ppm) of Oxidized Liquid |
|---|---|---|---|
| not added | not added | 9940 | 4.0 |
| $CuSO_4$ | $(NH_4)_2SO_4$ | 2350 | 37.8 |
| $Cu(OH)_2$ | $NH_4OSO_2NH_2$ | 2005 | 27.0 |
| CuS | $NH_4NO_3$ | 1804 | 31.5 |

*the amount added of the copper compound was 500 ppm as calculated as $Cu^{++}$.
**the amount added of the ammonium salt was 1.2 % by weight as calculated as $NH_4^+$.

EXAMPLE 2

An ammonium salt indicated below was made present in an amount of 1.2% by weight as calculated as $NH_4^+$ in 100 or 400 ml of an acetic acid aqueous solution having a TOC value (the total organic carbon concentration; same will apply hereinafter) of 3,920 ppm and containing, dissolved therein, copper sulfate in an amount of 500 ppm as calculated as copper), and the liquid was charged in the same vessel as used in Example 1 and air (in an amount 1.5 times the stoichiometric amount) was filled in the vessel. Oxidation of the solution was conducted at 250° C. under a pressure of 32 to 148 Kg/cm² for 1 hour. Effects of the ammonium salts added were evaluated and compared to obtain results shown in Table 3.

Table 3

| Ammonium Salt | TOC Removal Ratio (%) | Remarks |
|---|---|---|
| not added | 57 | |
| $(NH_4)_2SO_4$ | 86 | effective |
| $NH_4NO_3$ | 78 | effective |
| $NH_4HCO_3$ | 69 | effective |
| $NH_4OSO_2NH_2$ | 77 | effective |
| $NH_4I$ | 75 | effective |
| $NH_4Cl$ | 76 | effective |

Table 3-continued

| Ammonium Salt | TOC Removal Ratio (%) | Remarks |
|---|---|---|
| $HCOONH_4$ | 84 | effective |
| $CH_3COONH_4$ | 83 | effective |
| $C_2O_4(NH_4)_2$ | 85 | effective |
| ammonium hydrogentartarate | 96.4 | effective |
| $NH_4HSO_4$ | 43 | ineffective |
| $(NH_4)_2S_2O_3$ | 15.2 | ineffective |
| $(NH_4)_3PO_4$ | 23.8 | ineffective |
| $(NH_4)_2HPO_4$ | 26.7 | ineffective |
| $(NH_4)_2CO_3$ | 46.8 | ineffective |
| $NH_4Br$ | 53.4 | ineffective |
| $NH_4H_2PO_3$ | 36.2 | ineffective |
| $(NH_4)_2O \cdot 5B_2O_3 \cdot 8H_2O$ | 41.8 | ineffective |

EXAMPLE 3

Copper or a copper compound indicated below was added in an amount of 500 ppm as calculated as copper to 250 ml of waste water discharged from the rapid cooling step of the acrylonitrile-preparing process, which has a TOC value of 22,250 ppm and containing 5% by weight of $(NH_4)_2SO_4$, and in the same vessel as used in Example 1, the liquid was oxidized at a temperature of 250° C. under a pressure of 120 Kg/cm² for 1 hour by using as the oxygen source 32 liters (in the normal state) of air under agitation. Results obtained are shown in Table 4.

Table 4

| Copper component | TOC Removal Ratio (%) |
|---|---|
| not added | 56.4 |
| $CuSO_4$ | 89.2 |
| $Cu(OH)_2$ | 87.8 |
| CuO | 88 |
| $Cu(CH_3COO)_2$ | 87.9 |
| Cu powder | 86.1 |
| $CuSO_4 \cdot 3Cu(OH)_2 \cdot H_2O$ | 86.9 |

EXAMPLE 4

The same reaction vessel as used in Example 1 was charged with 130 ml of the same waste water as used in Example 3, that had CODMn value (the COD amount measured according to the potassium permanganate method; same will apply hereinafter) of 21 g/liter and a T-CN value of 1,800 mg/liter and contained 5% by weight of $(NH_4)_2SO_4$, and 22.3 liters (in the normal state; same will apply hereinafter) of air was filled in the vessel. The liquid was oxidized under agitation at a temperature of 250° C. under a pressure of 72 Kg/cm² for 1 hour. The oxidized liquid was analyzed to obtain the following results:
CODMn: 3,150 ppm
T-CN: 0.2 ppm
Cu concentration: below 0.1 ppm
Then, 10 liters of air and 34 mg of $CuSO_4$ were incorporated in the resulting oxidized liquid, and the mixture was treated at 250° C. for 1 hour in the same reaction vessel as used in Example 1, to obtain an oxidized liquid having the following composition:
CODMn: 1,020 ppm
T-CN: 31 ppm
Cu concentration: 98 ppm

EXAMPLE 5

T-CN in the oxidized liquid obtained in Example 4 (having a CODMn value of 1,020 ppm, a T-CN value of 31 ppm and a Cu concentration of 98 ppm) was oxidized and decomposed by using an oxidizing agent indicated below to obtain results shown in Table 5.

Table 5

| Oxidizing Agent | Treatment Conditions | Amount of Oxidizing Agent (weight ratio to CN) | Composition (ppm) of Treated Liquid | | |
|---|---|---|---|---|---|
| | | | CODMn | T-CN | Cu Concentration |
| NaOCl | 10° C., 15 minutes | 7.8 | 1018 | 0.08 | 98 |
| $H_2O_2$ | 70° C., 20 minutes | 3.5 | 1020 | 0.4 | 98 |
| $O_3$ | 50° C., 30 minutes | 5.0 | 1020 | 0.2 | 98 |
| $K_2S_2O_8$ | 90° C., 5 minutes | 28.3 | 1010 | 0.05 | 97 |

EXAMPLE 6

Copper sulfate was added to the same waste water as used in Example 3 (CODMn = 21 g/liter; T-CN = 1,800 mg/liter; $(NH_4)_2SO_4$ = 5% by weight) so that the copper concentration was 400 ppm as calculated as copper, and 130 ml of this liquid and 22.3 liter of air were charged in the same vessel as used in Example 1. Wet oxidation was conducted at a temperature of 250° C. and a pressure of 72 Kg/cm² under agitation for 1 hour. The resulting oxidized liquid was analyzed to obtain the following results:

CODMn: 315 ppm
T-CN: 38 ppm
Cu concentration: 398 ppm

NaOCl was added to this oxidized liquid so that its concentration in the oxidized liquid was 300 ppm. The liquid was stirred at 50° C. for 5 minutes to effect oxidation and decomposition of T-CN. Removal of copper from the resulting oxidized liquid was conducted by using an insolubilizing agent indicated below to obtain results shown in Table 6.

tration without performing oxidation and decomposition of cyanogen in advance. The treatment was carried out at 40° C. for 5 minutes. The precipitated copper component was separated by filtration and the filtrate was analyzed to obtain the following results:

CODMn: 318 ppm
T-CN: 20 ppm
Cu concentration: 20 ppm

COMPARATIVE EXAMPLE 2

The treatment for decomposition of cyanogen in the oxidized liquid obtained in Example 6 (CODMn = 315 ppm; T-CN = 38 ppm; Cu concentration = 398 ppm) was conducted at 30° C. for 2 minutes by using sodium hypochlorite in an amount 18.7 times the T-CN amount. Then, the triazine type sulfide used in Example 6 was added to the treated liquid in an amount 3.3 times the copper concentration, and the liquid was treated at 30° C. for 5 minutes. The precipitated copper component was separated by filtration and the filtrate was analyzed to obtain the following results:

CODMn: 310 ppm

Table 6

| Run No. | Insolubilizing Agent | Amount of Insolubilizing Agent or Amount Passed of Liquid | Treatment Conditions | | Cu Concentration (ppm) in Treated Liquid |
|---|---|---|---|---|---|
| | | | Temperature (° C.) | Time (minutes) | |
| 1 | $Na_2S$ | $Na_2S$/Cu weight ratio = 1.27 | 20 | 5 | 0.1 |
| 2 | triazine type sulfide* | sulfide/cu weight ratio = 3.3 | 50 | 5 | 0.1 |
| 3 | iron powder | $Fe^{++}$ eq./Cu eq. = 3.0 | 50 | 60 | 15 |
| 4 | calcium phosphate | Ca eq./Cu eq. = 30.7 | 70 | 60 | 57.5 |
| 5 | $FeSO_4$ + $Ca(OH)_2$ + $Na_2S$** | S eq./Cu eq. = 1.39 | 10 | 5 | 0.1 |
| 6 | $NH_2 . NH_2 . H_2SO_4$ | $NH_2 . NH_2 . H_2SO_4$/Cu weight ratio = 50 | 20 | 40 | 3.5 |
| 7 | $Na_2S_2O_4$ | $Na_2S_2O_4$ eq./Cu eq. = 2 | 50 | 6 | 0.6 |
| 8 | $FeCl_2$ | $FeCl_2$/Cu weight ratio = 2 | 40 | 30 | 0.5 |
| 9 | $NH_4$ type ion exchange resin | 69 ml/ml of the resin | 40 | | 0.2 |

*product marketed under tradename "Santiol" and manufactured by Sankyo Kasei.
**mixture comprising 14% of $FeSO_4$, 2.5% of $Ca(OH)_2$, 5% of $Na_2S$ and 78.5% of $H_2O$.

Treated liquids obtained in Runs Nos. 3, 4 and 6 (having Cu concentrations of 15 ppm, 57.5 ppm and 3.5 ppm, respectively) were treated at 50° C. for 4 minutes in the presence of the above triazine type sulfide in an amount 3.3 times the copper concentration (on the weight basis). In each case, the copper concentration was reduced below 0.1 ppm.

COMPARATIVE EXAMPLE 1

The treatment for removal of copper from the oxidized liquid obtained in Example 6 (CODMn = 315 ppm; T-CN = 38 ppm; Cu concentration = 398 ppm) was conducted by adding the triazine type sulfide used in Example 6 in an amount 3.3 times the copper concen- T-CN: 0.06 ppm
Cu concentration: 195 ppm The same insolubilizing agent was added to the so recovered filtrate in an amount 3.3 times the Cu concentration in the filtrate, and the filtrate was treated at 30° C. for 2 minutes. The Cu concentration in the liquid was reduced to 0.1 ppm.

EXAMPLE 7

The same waste water as used in Example 3 was agitated for 1 hour in the same reaction vessel as used in Example 1 under conditions of an oxidation temperature of 200° to 300° C., a reaction pressure of 31 to 150

Kg/cm$^2$ and an O$_2$ (fed as air)/TOC ratio of 3.0. Copper sulfate was added to the starting waste water so that the copper concentration was 500 ppm. For comparison, the treatment was carried out in the same manner without addition of copper sulfate. The TOC value in the resulting oxidized liquid was determined to obtain results shown in Table 7.

Table 7

| Copper Sulfate | Reaction Temperature (° C.) | Reaction Pressure (Kg/cm$^2$) | TOC Removal Ratio* (%) |
|---|---|---|---|
| not added | 200 | 31 | 46.9 |
| added | 200 | 31 | 73.7 |
| not added | 250 | 75 | 58.2 |
| added | 250 | 75 | 90.4 |
| not added | 300 | 150 | 87.9 |
| added | 300 | 150 | 95.4 |

*based on TOC in the starting waste water.

EXAMPLE 8

The same waste water as used in Example 3 was treated for 1 hour under conditions of a temperature of 250° C., an O$_2$/CODMn ratio of 2 and a pressure of 70 Kg/cm$^2$ in the presence of dissolved copper (added as copper sulfate) at a copper concentration of 500 ppm. The oxidized liquid was then subjected to gas-liquid separation, oxidation and decomposition of cyanogen (the liquid was treated at 20° C., for 10 minutes in the presence of 390 ppm of NaOCl as an oxidizing agent), pH adjustment and ion exchange for recovery of the copper component. In this Example, conditions of the gas-liquid separation and pH adjustment were examined, and conditions optimum for recovery of the copper component by ion exchange were determined.

In the first place, the gas-liquid separation was conducted at various temperatures, and amounts of sulfuric acid necessary for adjusting the pH of the oxidized liquids recovered from the cyanogen decomposition step to 4.5 were examined to obtain results shown in Table 8.

Table 8

| Gas-Liquid Separation Temperature (° C.) | Amount of Sulfuric Acid Necessary for Adjusting pH of Oxidized Liquid to 4.5 (Kg, H$_2$SO$_4$/m$^3$, oxidized liquid) |
|---|---|
| 90 | 16 |
| 140 | 9 |
| 160 | 6.5 |
| 180 | 4.5 |
| 200 | 4.5 |

Then, influences of the pH of the oxidized liquid and the gas-liquid separation temperature on the equilibrium adsorption at the ion exchange step were examined to obtain results shown in Table 9.

Table 9

| | Equilibrium Adsorption (g. eq. of Cu/liter of resin) | |
|---|---|---|
| pH | gas-liquid separation at 90° C | gas-liquid separation at 180° C. |
| 3.0 | 0.08 | 0.11 |
| 4.0 | 0.43 | 0.6 |
| 4.5 | 0.93 | 1.34 |
| 5.0 | 1.39 | 1.84 |
| 5.5 | 1.79 | 2.49 |
| 6.0 | 1.75 | 2.45 |
| 7.0 | 0.80 | 1.12 |
| 8.2 (not adjusted) | 0.31 | 0.43 |

From the results shown in Tables 8 and 9, it will readily be understood that when the gas-liquid separation conducted at a temperature of 100° to 200° C., the amount of an acid required for the pH adjustment can be reduced, and that when the pH of the liquid to be passed through an ion exchange resin for adsorption of the copper component is adjusted to 4 to 7, a good separation efficiency can be attained.

EXAMPLE 9

Waste water discharged from an acrylonitrile-producing plant (having a CODCr value of 24,600 ppm and a T-CN value of 1,800 ppm and containing 5% by weight of (NH$_4$)$_2$SO$_4$) was treated at a rate of 330 liters per hour by passing it through the steps of wet oxidation, high-temperature gas-liquid separation, cyanogen decomposition, pH adjustment, degassing and removal of copper ions. Apparatuses and treatment conditions adopted in these steps were as follows:

1. Wet Oxidation and Gas-Liquid Separation:
   Wet oxidizing column: inner diameter = 275 mm, height = 5,000 mm
   Reaction temperature: 240 – 250° C.
   Reaction pressure: 70 Kg/cm$^2$
   Air feed rate: 34 m$^3$ per hour (in the normal state)
   Copper concentration: 500 ppm (added to waste water in the form of copper sulfate)
   Gas-liquid separation temperature: 190° C.
   Gas-liquid separation pressure: 68 Kg/cm$^2$
2. Cyanogen Decomposition:
   Oxidizing agent: 12% sodium hypochlorite
   Amount added: 7.8 times the amount of cyanogen (on the weight basis)
   Temperature: 50° C.
   Treatment time: 30 minutes
3. pH Adjustment:
   pH adjusting agent: 98% H$_2$SO$_4$
   Adjusted pH. 4.7 – 5.0
   Dilution: not conducted
4. Degassing:
   Air feed rate: 2.5 m$^3$ of air per m$^3$ of pH-adjusted liquid
   Flow rate of air: 0.5 m$^3$ per minute
   Degassing time: 5 minutes
5. Ion Exchange:
   Kind of resin: weakly acidic ion exchange resin
   Ion exchange column: inner diameter = 186 mm, height = 5,000 mm
   Elution column: inner diameter = 40 mm, height = 6,500 mm
   Salting-out column: inner diameter = 67 mm, height = 3,000 mm
   Amount circulated of resin: 10 liter per hour
   Salting-out agent: 1N-NH$_4$OH (concentration in salting-out column)
   Eluent: 3N-H$_2$SO$_4$ (concentration O in elution column)

In the liquid which had passed through the foregoing treatment steps, the CODCr value was 250 ppm, the cyanogen concentration was 0.1 ppm and the copper ion concentration was below 0.1 ppm.

For comparison, the above waste water was wet-oxidized under the same conditions as above except that no copper ion was made present in the waste water, and the oxidized liquid was passed through the above treatment steps in the same manner. In the treated liquid, the CODCr value was 9,600 ppm and the cyanogen concentration was 0.5 ppm.

As is apparent from the experimental results illustrated in the foregoing Examples, when organic waste water containing cyanogen or a compound capable of forming cyanogen under oxidative conditions is treated according to the treatment method of this invention, cyanogen and oxygen-demanding substances contained in the waste water are oxidized and decomposed at high efficiencies. Further, copper ions resulting from a treating agent used can be effectively recovered and hence, there is no fear of secondary pollution. Accordingly, this invention makes great contributions to the art.

What is claimed is:

1. A method for treating organic waste water containing inorganic-CN to render it harmless by oxidation, which comprises the steps of:
   A. subjecting the waste water to a wet oxidation treatment in the presence of copper or a copper compound and at least one ammonium salt selected from the group consisting of ammonium sulfate, ammonium nitrate, ammonium sulfamate, ammonium hydrogencarbonate, ammonium chloride, ammonium iodide, ammonium formate, ammonium acetate, ammonium oxalate and ammonium hydrogentartrate at a temperature of 175° to 300° C under a pressure of 20 to 150 kg/cm$^2$;
   B. subjecting the effluent from the wet oxidation treatment to gas-liquid separation to recover gas and oxidized liquid;
   C. subjecting the recovered oxidized liquid to a treatment with a substance capable of generating oxygen in the nascent state in water to effect oxidation-decomposition of the inorganic-CN remaining in said recovered oxidized liquid thereby to decompose the inorganic-CN to carbon dioxide and nitrogen; and
   D. recovering the copper component from the oxidized liquid.

2. A method according to claim 1 wherein the wet oxidation (A) is conducted at a temperature of 200° to 300° C. under a pressure of 30 to 150 kg/cm$^2$.

3. A method according to claim 1 wherein said substance is at least one member selected from the group consisting of hypochlorites, hydrogen peroxides, persulfates and ozone.

4. A method according to claim 1 wherein the copper component used in the wet oxidation step (A) is at least one member selected from the group consisting of metallic copper powder, copper oxide, copper sulfate, copper hydroxide, copper sulfide, basic copper sulfate and copper acetate.

5. A method according to claim 1 wherein the recovery of the copper component in step (D) is conducted by adding an insolubilizing agent to the oxidized liquid to precipitate the copper component in the form of an insoluble salt and the precipitated copper salt is separated by filtration or decantation.

6. A method according to claim 5 wherein the insolubilizing agent is a member selected from the group consisting of sodium sulfide; triazine type sulfides; aqueous slurry compositions comprising 10 to 20% by weight, based on the composition, of ferrous sulfate, 2 to 10% by weight, based on the composition, of sodium sulfide and 1 to 5% by weight, based on the composition, of calcium hydroxide; hydrazine sulfate; hydrosulfite; ferrous chloride; iron powder; calcium phosphate and weakly acidic ion exchange resins.

7. A method according to claim 5 wherein the gas-liquid separation is conducted at room temperature to 300° C.

8. A method according to claim 1 wherein the gas-liquid separation in step (B) is conducted by flashing the effluent from the wet oxidation step (A) at a temperature higher than 100° C., after the inorganic-CN decomposition step (C) the pH of the oxidized liquid is adjusted to 4 to 7, and the recovery of the copper component in step (D) is conducted by ion exchange.

9. A method according to claim 8 wherein the ion exchange is performed by using a weakly acidic ion exchange resin of the salt type.

10. A method according to claim 1 wherein the copper component is present in step (A) in an amount corresponding to a concentration of 10 to 1,000 ppm of copper.

11. A method according to claim 1 wherein the ammonium salt is present in step (A) in an amount corresponding to a concentration of at least 1,200 ppm of ammonium ion.

12. A method according to claim 8 wherein the oxidized liquid is subjected to degassing after pH adjustment but before the ion exchange treatment.

13. A method according to claim 8 wherein the oxidized liquid from the inorganic-CN decomposition step is diluted with water prior to the pH adjustment.

* * * * *